(12) United States Patent
Hession

(10) Patent No.: US 10,759,220 B2
(45) Date of Patent: Sep. 1, 2020

(54) CASTER WHEEL PROTECTION SYSTEM

(71) Applicant: Peter Hession, Greenwood Village, CO (US)

(72) Inventor: Peter Hession, Greenwood Village, CO (US)

(*) Notice: Subject to any disclaimer, the term of this patent is extended or adjusted under 35 U.S.C. 154(b) by 0 days.

(21) Appl. No.: 16/439,989

(22) Filed: Jun. 13, 2019

(65) Prior Publication Data

US 2019/0381828 A1    Dec. 19, 2019

Related U.S. Application Data

(60) Provisional application No. 62/684,448, filed on Jun. 13, 2018.

(51) Int. Cl.
*B60B 33/00*    (2006.01)

(52) U.S. Cl.
CPC .... *B60B 33/0015* (2013.01); *B60B 2900/212* (2013.01); *B60B 2900/551* (2013.01)

(58) Field of Classification Search
CPC ... Y10T 16/207; Y10T 16/216; Y10T 16/184; B60B 33/0015; B60B 33/00; B60B 33/0002; B60B 33/006; B60B 7/00; B60B 7/06; B60B 7/061; B60B 2900/212; B60B 2900/551; A47B 91/00; A47B 95/043; A47B 2095/046; A47B 91/12; A47C 19/024

See application file for complete search history.

(56) References Cited

U.S. PATENT DOCUMENTS

| | | | |
|---|---|---|---|
| 2,025,448 A | | 12/1935 | Hebbinghaus |
| 2,046,384 A | * | 7/1936 | Katcher ................. B60B 33/00 248/188.1 |
| 2,059,420 A | | 11/1936 | Ward, Jr. |
| 2,483,241 A | | 2/1946 | Shepherd |
| 2,471,958 A | * | 5/1949 | Humphreys ............ B60B 33/00 16/18 CG |
| 2,830,545 A | | 4/1958 | Robinson et al. |
| 2,996,752 A | | 8/1961 | Pope |
| 3,231,293 A | * | 1/1966 | Loustaunau ............. A61G 5/10 280/211 |
| 3,744,080 A | * | 7/1973 | Smith, Jr. ............... B60B 33/00 15/256.51 |
| 4,288,088 A | * | 9/1981 | Harrison ............ A63C 17/1436 280/11.215 |
| 5,170,528 A | | 12/1992 | Navar et al. |

(Continued)

FOREIGN PATENT DOCUMENTS

| | | |
|---|---|---|
| CH | 633996 A4 | 1/1983 |
| CN | 208593245 U * | 3/2019 |

(Continued)

*Primary Examiner* — Chuck Y Mah
(74) *Attorney, Agent, or Firm* — Nick Guinn; Gunn, Lee & Cave, P.C.

(57) ABSTRACT

A device for removing obstructions impeding movement of equipment is disclosed. The device includes two panels connected by four axles, each axle rotatably connected to the panels, and two bridges. Two brush assemblies—each having an adaptor, a platform, and a plurality of brushing articles—are connected to the bridges. When a user mounts the device around a caster wheel, obstructions are pushed away from the caster wheel by the one or more bristle implements.

11 Claims, 6 Drawing Sheets

(56) References Cited

U.S. PATENT DOCUMENTS

| | | | |
|---|---|---|---|
| 5,173,990 A | | 12/1992 | Owen |
| 5,371,920 A | | 12/1994 | Rainville |
| 5,615,450 A | * | 4/1997 | Butler .................... B60B 33/00 16/18 CG |
| 5,873,144 A | | 2/1999 | Tupper |
| 6,125,504 A | | 10/2000 | Richard |
| 6,678,917 B1 | | 1/2004 | Winters et al. |
| 9,108,462 B1 | * | 8/2015 | Stone ................. B60B 33/0023 |
| 9,944,120 B1 | * | 4/2018 | Butler ................. B60B 33/0063 |
| 10,441,080 B2 | * | 10/2019 | Hall ................... A46B 15/0004 |
| 10,442,246 B2 | * | 10/2019 | Barker ................... B60R 19/54 |
| 2004/0088821 A1 | * | 5/2004 | Imperato ............. A47C 19/024 16/18 CG |
| 2009/0261215 A1 | | 10/2009 | Lambert |
| 2013/0097808 A1 | | 4/2013 | Long et al. |
| 2015/0328926 A1 | * | 11/2015 | Illing ................. B60B 33/0026 16/18 CG |
| 2018/0281516 A1 | | 10/2018 | Hession |

FOREIGN PATENT DOCUMENTS

| | | | |
|---|---|---|---|
| GB | 2467574 A | | 11/2010 |
| JP | 2000071708 A | | 3/2000 |
| JP | 2000343902 A | * | 12/2000 |
| JP | 2001275805 A | | 10/2001 |
| JP | 6335602 U | | 11/2015 |

\* cited by examiner

CASTER WHEEL PROTECTION SYSTEM

CROSS REFERENCES TO RELATED APPLICATION

This application claims the benefit of and priority to U.S. Provisional Application Ser. No. 62/684,448 filed Jun. 13, 2018, which is incorporated by reference herein.

FEDERALLY SPONSORED RESEARCH OR DEVELOPMENT

Not applicable.

BACKGROUND OF THE INVENTION

1. Field of the Invention

The present invention relates to the movement of objects supported by caster wheels. More specifically, the invention is a device that attaches to and generally circumscribes a caster wheel and prevents objects on the ground from impeding movement of the caster wheel.

2. Description of the Related Art

Large objects supported by caster wheels can present particular problems—namely, efficient movement and adjustment. These problems are solved, in part, by using caster wheels. Unfortunately, caster wheels only solve part of the problem, and introduce new problems. Once caster wheels are added, the weight of the object, may damage cables, cords or other objects located on the ground if and when the caster wheel is run across. Additionally, the cables, cords or other objects are easily tangled in the caster wheel which can abruptly stop the equipment in its path. At a minimum, cables, cords or other objects slow down a user's ability to move the object or other large piece of equipment. In certain environments such as a surgical environment, these problems can have devastating consequences.

Information relevant to attempts to address these problems can be found in U.S. Pat. Nos. 5,170,528; 5,371,920; 5,873,144; and 6,125,504. However, each one of these references suffers from one or more disadvantages, including: obstructing movement of the wheel(s); inhibiting removal and/or replacement; interfering with other structures on the wheel such as brakes, levers controlling height or articulating arm supporting wheel; nonconforming size as compared to the wheel; occupying unnecessary floor space thereby creating tripping hazards; failing to transition between floor surfaces of differing height; and becoming tangled with cables, wires, dirt, hair or other debris. For the foregoing reasons, there is a need for a system that moves easily with the accompanying wheel and eliminates obstructions from the wheel's path.

BRIEF SUMMARY OF THE INVENTION

It is an object of the present invention to provide for unimpeded movement of a caster wheel when rotating, pushing, or pulling a load.

It is a further object of the invention to provide a system that adjusts to different size caster wheels.

It is a further object of the invention to provide a system that is easy to apply or remove.

It is a further object of the invention to provide deflecting structures that arranged in such a way so as to maintain constant tilt with the ground surface (i.e., not teeter totter).

These and other embodiments of the present invention will become apparent to those of skill in the art upon review of this specification, including its drawings and claims.

DETAILED DESCRIPTION OF THE INVENTION

Figure 1:
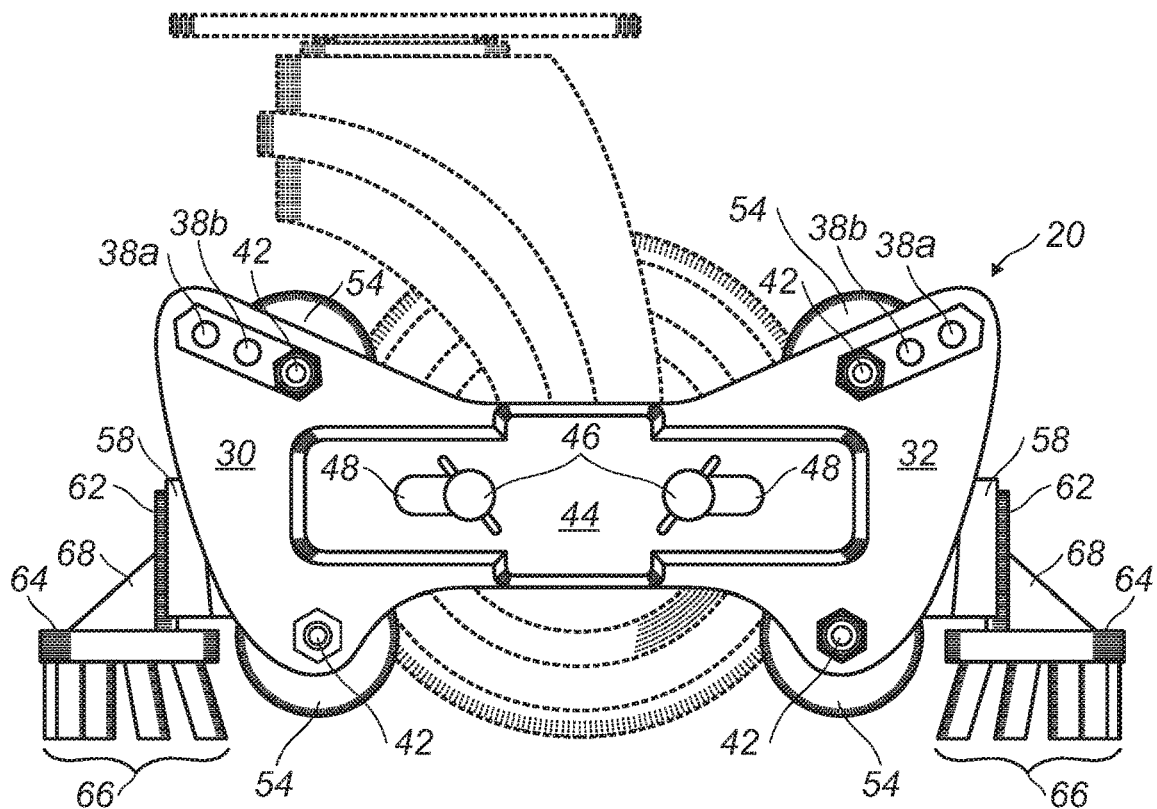
FIG. 1 is a front plan view of one embodiment of the present invention.
Figure 2:
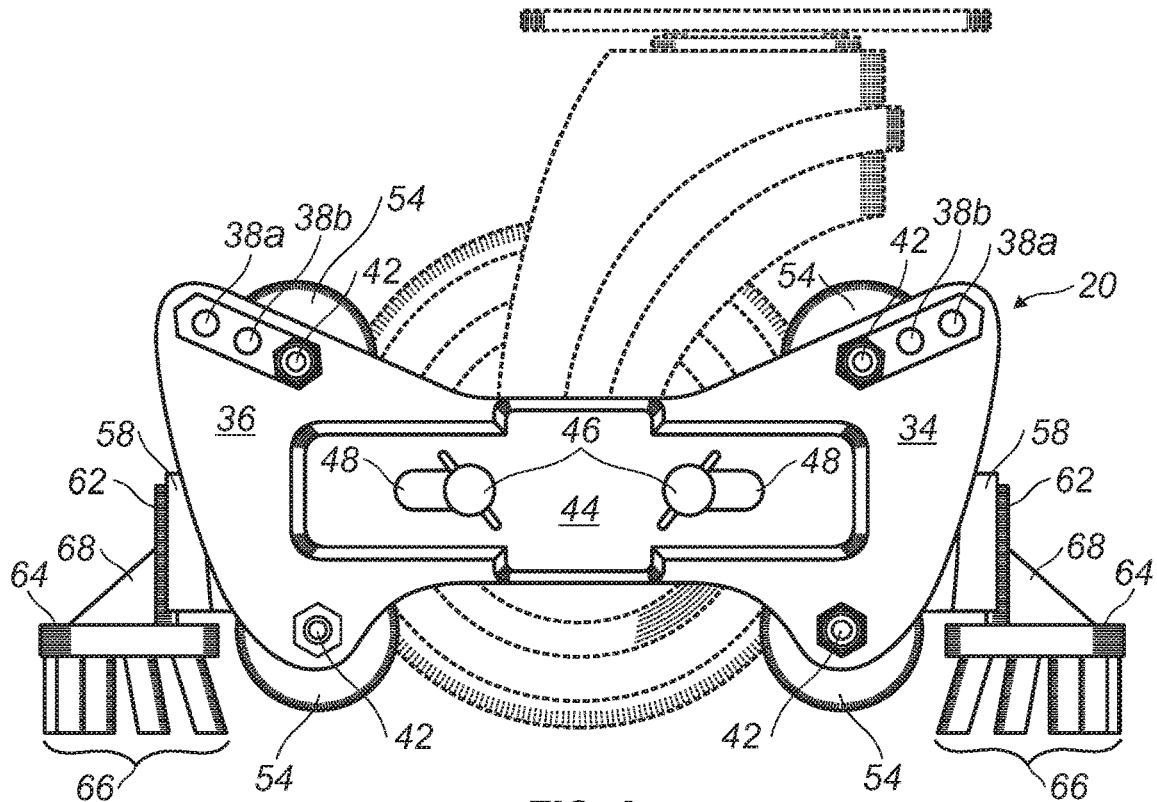
FIG. 2 is a rear plan view of the embodiment shown in FIG. 1.

FIG. 1 and FIG. 2 illustrate an embodiment of the present invention: a device 20 used in conjunction with a caster wheel (illustrated in broken lines). FIG. 1 and FIG. 2 illustrate the device from a front and back perspective, respectively. FIG. 1 shows the device 20 having a first plate 30 and a second plate 32. FIG. 2 shows the device 20 having a third plate 34 and fourth plate 36. In this embodiment, each plate has three upper roller orifices 38*a*, 38*b*, 38*c*.

In this embodiment, the first plate 30 and second plate 32 collectively resemble the shape of a bowtie generally consisting of four vertices around approximately four parabolic curves. Of course, these shapes are not necessarily parabolic. The term "parabola" is used simply as an approximation.

The three upper roller orifices 38*a*, 38*b*, 38*c* of the first plate are located near the upper vertex of the first plate 30 and the three upper roller orifices 38*a*, 38*b*, 38*c* of the second plate 32 are located near the upper vertex of the second plate 32. One of the three upper roller orifices 38*c* along the first plate 30 and one of the upper roller orifices 38*c* of the second plate 32 are not visible because axle hardware 42 obstructs the view of at least one upper roller orifice along the first plate 30 and at least one upper roller orifice the second plate 32. As discussed below, axle hardware 42 holds an axle in a rotatable, fixed position between multiple plates.

The first plate 30 has one lower roller orifice 40 located near the lower vertex of the first plate 30. The second plate 32 has one lower roller orifice 40 located near the lower vertex of the second plate 32. The lower roller orifices 40 of the first plate 30 and the second plate 32 are not visible in FIG. 1 (or FIG. 2) because there is axle hardware 42 positioned over the lower roller orifices 40. As a result, the axle hardware 42 obstructs the view of the lower roller orifices 40.

FIG. 1 also illustrates an extender 44 connected to the fronts of the first plate 30 and the second plate 32. Here, the extender 44 is a cross or t-shape. The extender 44 is generally wider than it is tall so that the first plate 30 and the second plate 32 can be pulled away or pushed toward each and fixed in a desired position. For example, if a user wishes to remove or insert new caster wheel from or into the device 20, the user can separate the first plate 30 and the second plate 32 without disassembling the device 20. Similarly, a user can accommodate different size caster wheels by separating the plates or moving the plates closer together. In this embodiment, the extender 44 is slidably connected and removable from the first plate 30 and the second plate 32.

While a user could disassemble the device 20, the extender 44 generally remains in contact with the first plate 30 and the second plate 32 by virtue of thumbscrews 46 or other locking mechanisms that pass through extender orifices 48 into threaded orifices (not numbered) in each of the first plate and second plate.

Each thumb screw 46 has a body 50 and a threaded arm 52. The body 50 has a diameter that is longer than at least one dimension of an extender orifice 48. That is, the diameter of the body 50 is sufficiently large that it cannot pass through the extender orifice 48. The threaded arm 52 extends from the body 50. The threaded arm 52 resembles a common threaded screw shaft or threaded bolt shaft. The threaded arm 52 passes through the extender orifice 48 into a threaded orifice of the first plate or the second plate. The thickness of the threaded arm 52 is sufficiently narrow respective to the width of the extender orifice 48 such that a user can noticeably adjust the position of a plate and thumbscrew 46 relative to the extender 44.

A user can adjust the positions of the first plate 30 and second plate 32 by loosening one or both thumbscrews 46 and pushing or pulling the first plate 30 and the second plate 32 toward or away from the other. When a user is satisfied with the position of the first plate 30 with respect to the second plate 32 the user can tighten the thumbscrew 46, thereby fixing that plate in position with respect to the extender 44 and the other plate.

FIG. 1 shows the device having four wheels 54 (FIG. 2 shows the device having four different wheels 54). Each of the wheels 54 is positioned along one of the axles 56 (not illustrated in FIG. 1 or FIG. 2). This device thus has four axles 56, each having two wheels 54 positioned thereon. The two wheels 54 positioned along each axle 56 straddle the caster wheel shown in broken lines. As the caster wheel turns, so to do the wheels 54 and the axles 56.

FIG. 1 also shows bridges 58 connected to and extending from each of the first plate 30 and the second plate 32. Each bridge 58 is constructed of a relatively ridged material in order to add stability to the device 20. Although not shown in FIG. 1 or FIG. 2, one bridge 58 connects the first plate 30 to the third plate 34, and the other bridge 58 connects the second plate 32 to the fourth plate 36. Each bridge 58 also connects to a brush assembly 60.

FIG. 1 shows each brush assembly 60 having an adaptor 62, brush platform 64, and a plurality of rubber fingers 66.

FIG. 1 shows the brush platform 64 relatively horizontal and perpendicular to the bridge 58. FIG. 1 also shows the plurality of rubber fingers 66 extending at different angles from the brush platform 64. Specifically, several of the rubber fingers extend perpendicularly from the brush platform 64 (and thus parallel to the bridge 58), while other rubber fingers extend at 70 and 80 degree angles from the brush platform 64. These angles, of course, are not limiting, they are merely illustrative. The varying angles of the rubber fingers provide a benefit to this device when used. Caster wheels frequently encounter obstacles/obstructions when moved. One objective of the device 20 is to clear or push such obstacles away.

Additionally, caster wheels are sometimes moved across uneven surfaces and surfaces with gaps such as elevator thresholds. When the device 20 is positioned around a caster wheel and the wheel moves across such a surface, the angled fingers serve reduce disruption to the device and the caster wheel when crossing the surface or the height differential. For example, the angled rubber fingers prevent the device 20 from teeter tottering. Similarly, the device 20 shows the rubber fingers 66 arranged nonlinearly around the brush platform 64. The nonlinear arrangement of the rubber fingers 66 provides a similar benefit. The arc shape of the brush platform 64 contributes to this benefit. For example, a flat or rectangular platform might encourage linear arrangement of bristle implements (e.g., rubber fingers), which does not offer the benefit of nonlinear arrangement.

FIG. 2 shows the same embodiment but from the back view. In this embodiment, the third plate 34 and the fourth plate 36 are nearly identical to the first plate 30 and the second plate 32, respectively. And the other structures discussed above are connected and operated similarly.

Figure 3:
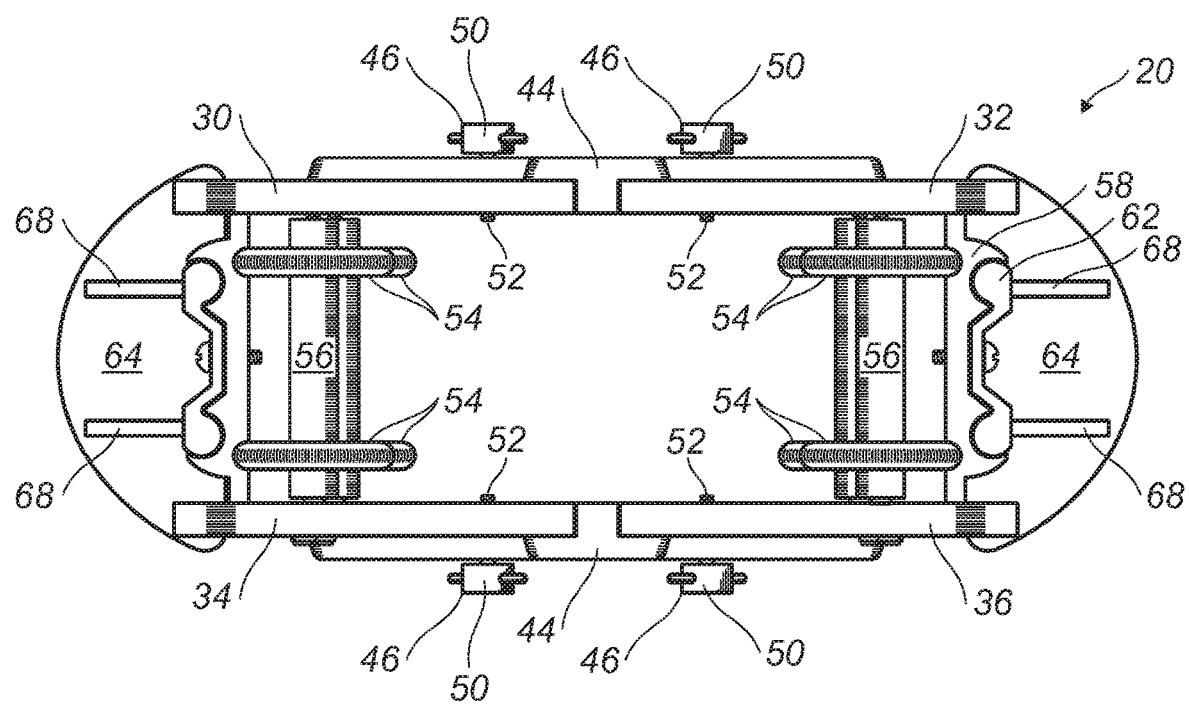
FIG. 3 is a top plan view of the embodiment shown in FIG. 1.

FIG. 3 illustrates the device from a top view. FIG. 3 shows the threaded arm 52 of each thumbscrew 48 extending through the extender 44 and through a plate 30, 32, 34, 36. This figure shows a portion of the extender 44 positioned in between the first plate 30 and the second plate 32 or alternatively, a portion of the second extender 44 positioned between the third plate 34 and the fourth plate 36. By arranging and constructing each extender this way it adds stability to the device.

Each axel 56 is secured to two plates (e.g., the first and third plates; the second and fourth plates). Each axel 56 is secured using axle hardware 42 to one of the upper roller orifices 38a, 38b, 38c or a lower roller orifice 40.

FIG. 3 also illustrates each of the brush platforms 64 having a generally arc shape, and the brush assembly 60 being attached to a bridge 58 via an adaptor 62. The bridges 58 as illustrated in this embodiment has multiple concave indentions, which correspond to certain convex protrusions of the adaptor 62. The complimenting interface might be characterized as a bridge track and/or an adaptor track. As a result, the adaptor 62 and the bridge 58 form a smooth and flush connection. In this embodiment, each bridge 58 is fixed in position relative to the plates the bridge connects. Each brush assembly 60 is generally adjustable with respect to the remainder of the device 20, namely, the plates and the bridges. By having the complementary convex and concave shapes along the adaptor 62 and the bridge 58, respectively, the user can slide and adjust the vertical displacement of the brush assembly 62 with respect to the bridge 58. When the user finds a vertical displacement that is desirable, the user can fix the brush assembly via the adaptor in place with respect to the bridge via hardware or other locking mechanisms such as the screw illustrated in FIG. 3.

The brush assembly adds stability through the supports 68 connected to both the brush platform 64 and the adaptor 62.

FIG. 3 also illustrates each axle 56 having two wheels 54 positioned relatively close to opposing ends of the axle and each wheel relatively close to one of the plates. In certain embodiments, the wheels 54 are adjustable along the length of the axle 56. That is, the wheels can move toward or away from each other and thus, toward or away from the neighboring plates. The adjustability gives the user opportunity to more easily add or remove a caster wheel in position to the device. It also allows the user to adjust the wheels along the axle to complement the caster wheel in the best position.

Figure 4:
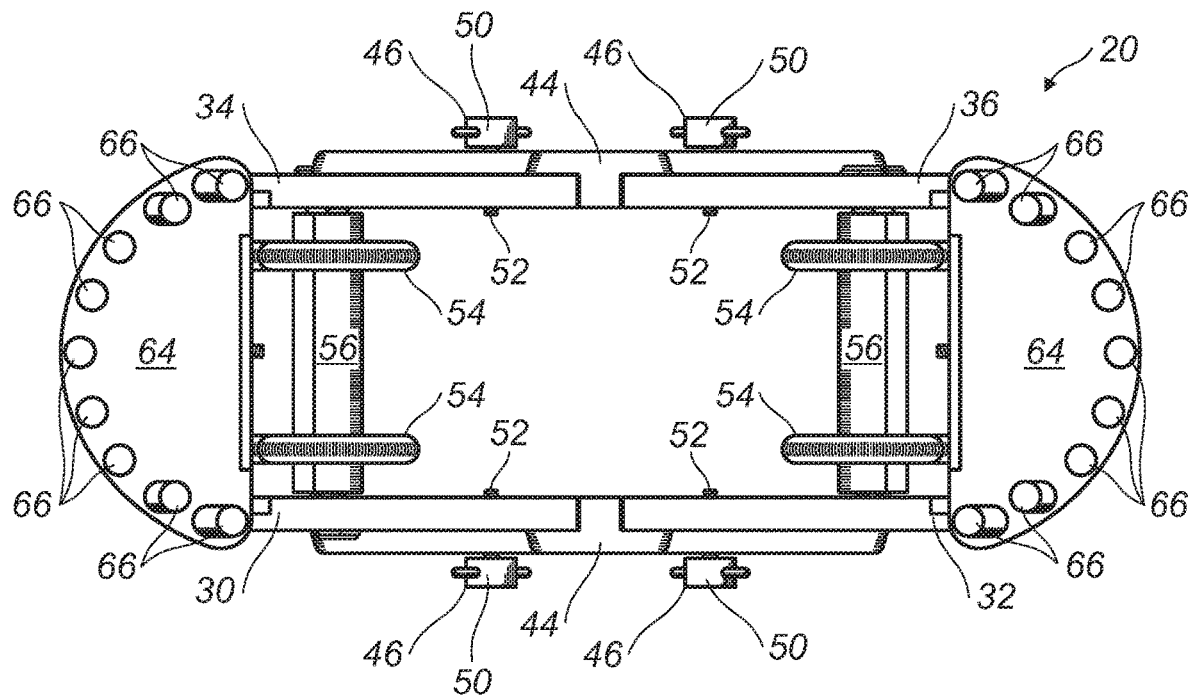
FIG. 4 is a bottom plan view of the embodiment shown in FIG. 1.

FIG. 4 illustrates the plurality of rubber fingers 66 arranged in a nonlinear orientation along the brush platforms 64. In this embodiment, the rubber fingers 66 are positioned on the bottom of the brush platforms 64 and positioned near the external perimeter of each platform.

FIG. 4 also shows several of the rubber fingers 66 extending at different angles from the respective brush platform 64: several of the rubber fingers 66 extend perpendicularly away from the brush platform 64 while other rubber fingers extend at non-perpendicular angles.

Figure 5:
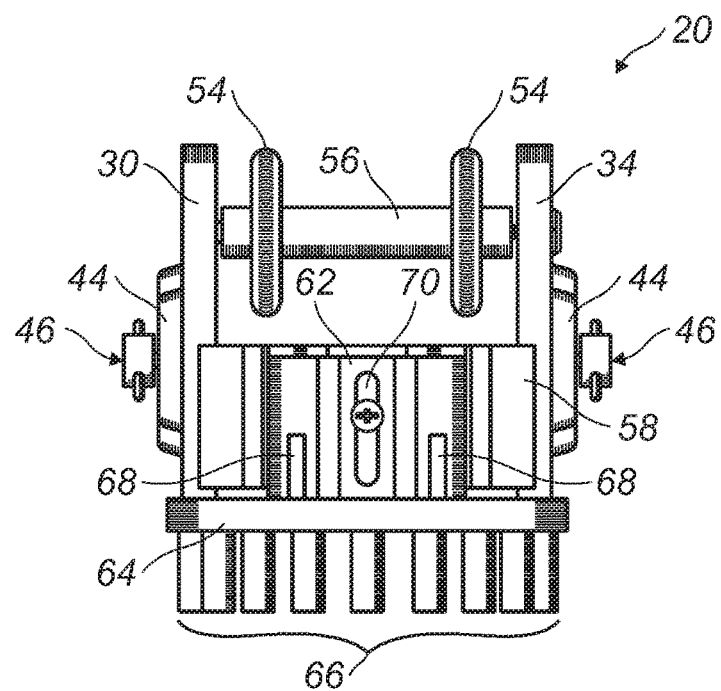
FIG. 5 and FIG. 6 are two side plan views of the embodiment shown in FIG. 1.
Figure 6:
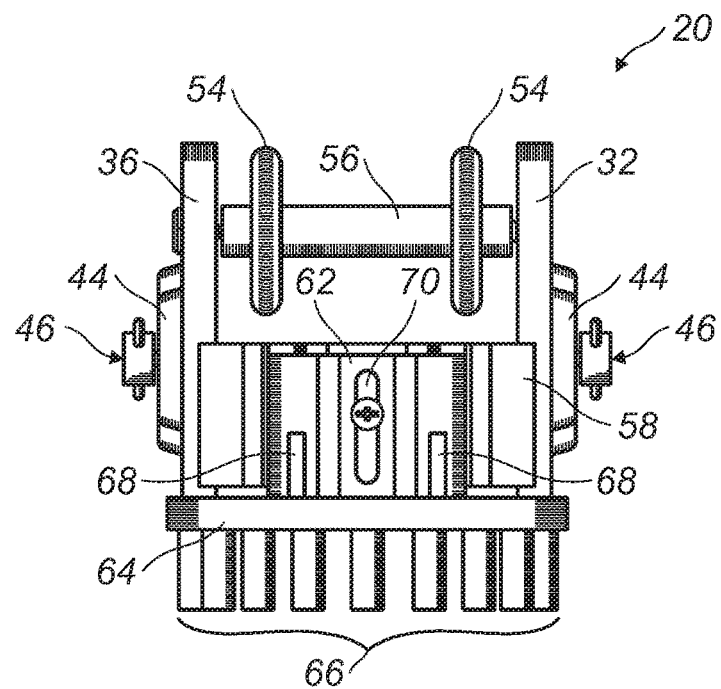

FIG. 5 and FIG. 6 illustrate opposing side views of the device. FIG. 5 and FIG. 6 illustrate the locking mechanism (i.e., screw) positioned on the adaptor 62, holding the adaptor 62 in place with respect to the bridge 58. The locking mechanism exists along an adaptor orifice 70, which can adjust with respect to a fixed position along the bridge 58. When the user has the brush assembly 60 in a desired position, the user can lock the locking mechanism on the brush assembly 60 with respect to the bridge.

Figure 7:
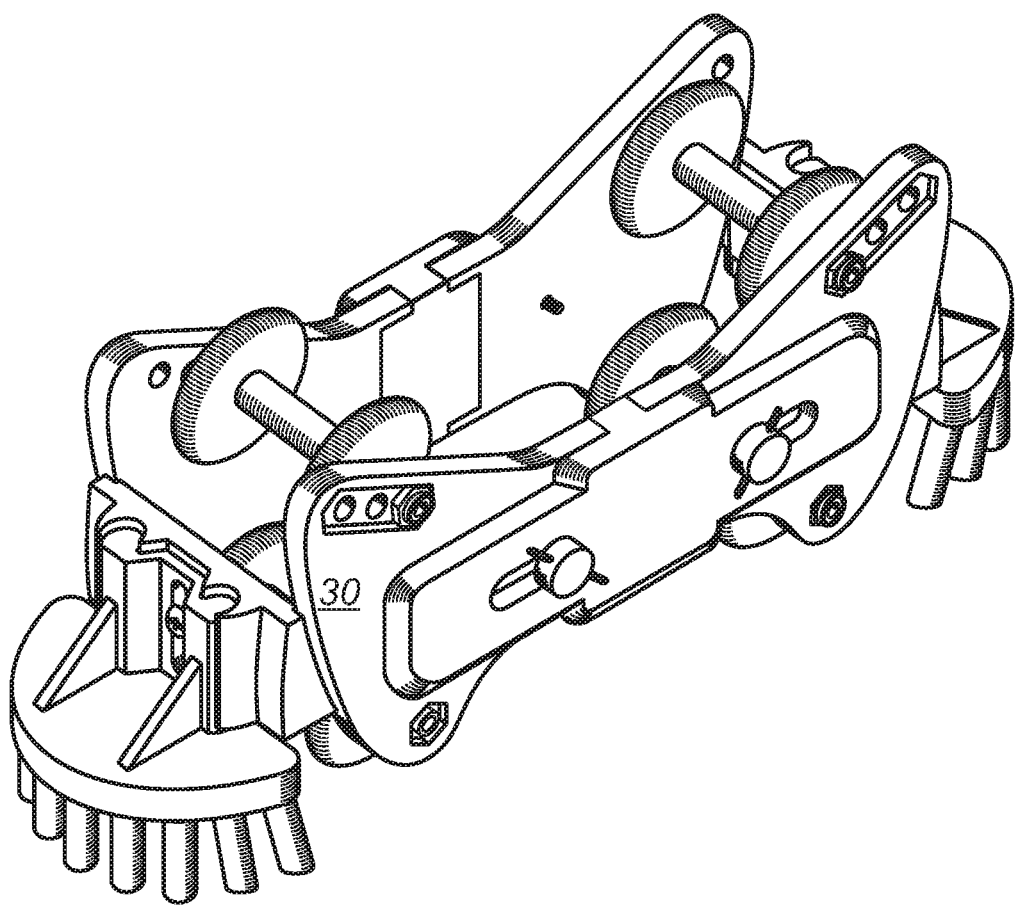
FIG. 7 perspective view of the embodiment shown in FIG. 1.
Figure 8:
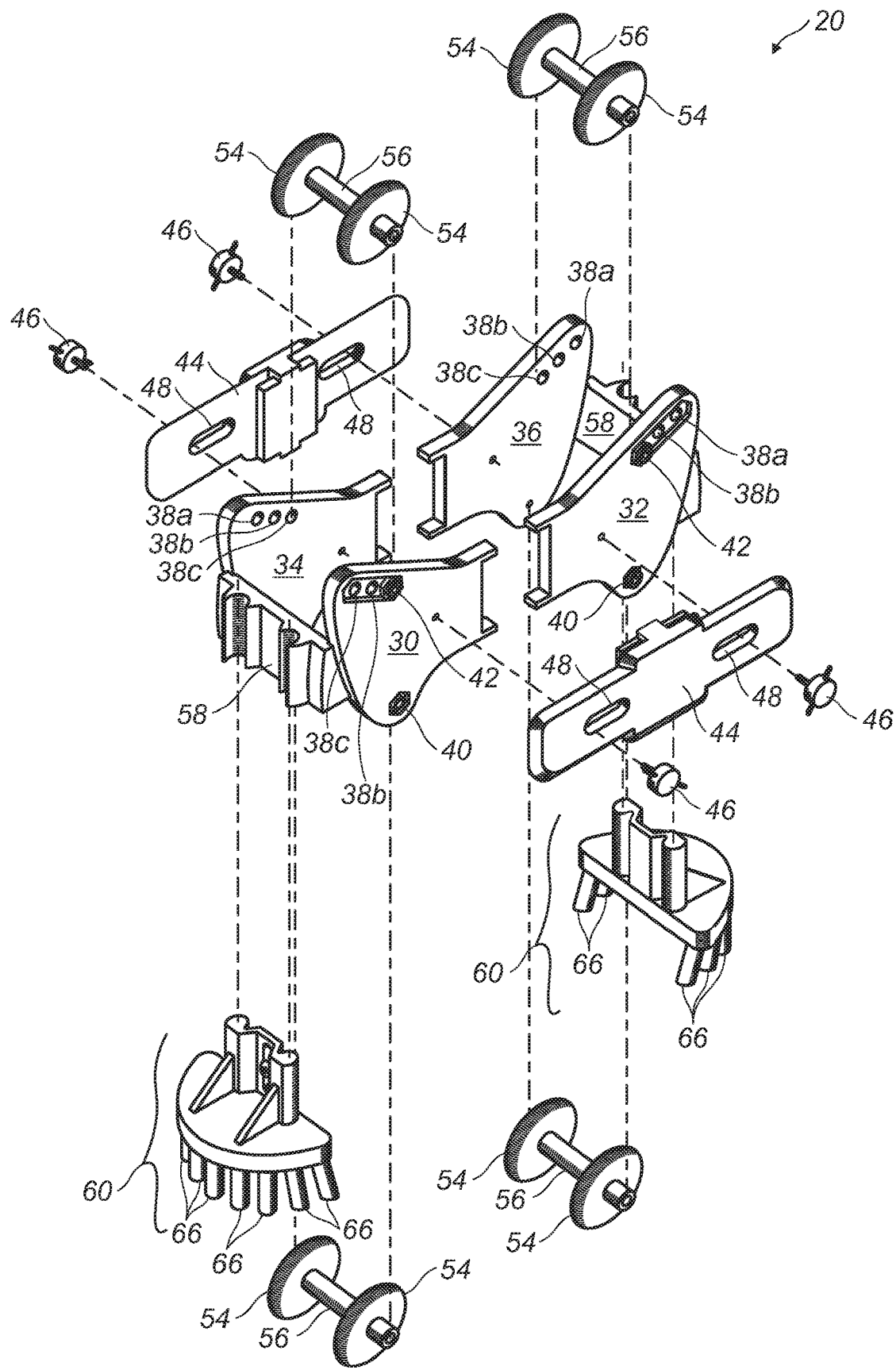
FIG. 8 is an exploded view of the embodiment shown in FIG. 1.

FIG. 7 illustrates a perspective view of the device. In particular, FIG. 7 illustrates a closed assembly of the device: the plates are all positioned in their closest position with respect to one another and the plates have not been separated or extended outwardly from one another. As a result, the thumbscrews are most closely positioned to one another along the extender orifices 40.

Figure 9:
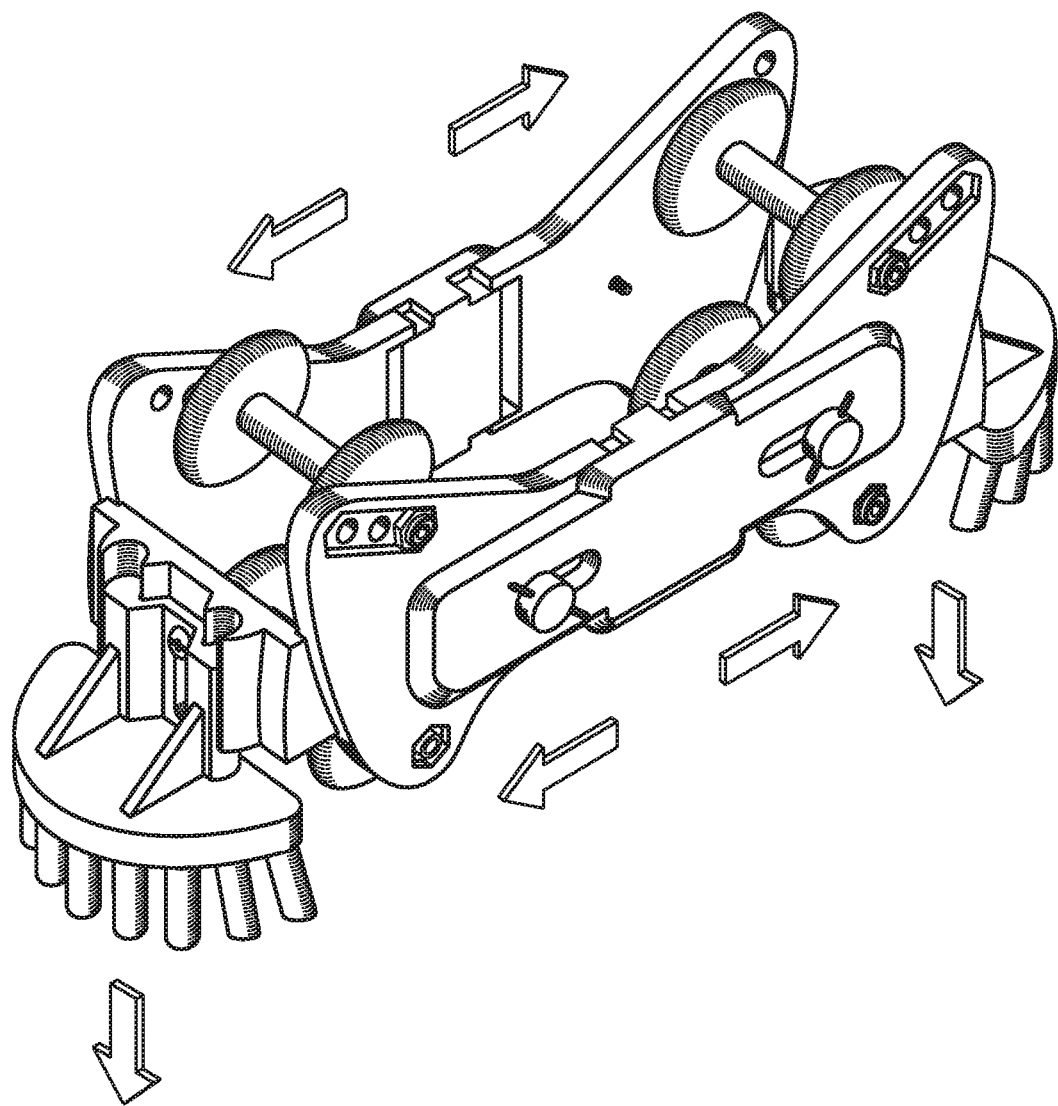
FIG. 9 is a perspective view of the embodiment shown in FIG. 1 further illustrating the movement of certain mechanical parts.

FIG. 9 shows the device 20 in an open position: the plates have been pulled away from another. Specifically, the first plate 30 and the second plate 32 have been pulled apart. Similarly, the third plate 34 and the fourth plate have been pulled apart.

The locking mechanisms or thumbscrews have been extended outwardly along the extender orifices 40. The arrows provided in FIG. 9 are used to show the direction of movable pieces and are not components of the invention. FIG. 9 also shows the brush assembly in an extended and open position lowered with respect to the bridges and remainder of the device.

In alternative embodiments, the rubber fingers might be replaced or supplemented with other brushing implements. As used herein, the term brushing implements refers to structures suited for deflecting obstructions on a floor. Brushing implements include: rubber fingers, blades, plows, bristles, hair (e.g., boars hair) and needles.

In alternative embodiments, rather than an arrangement of nine relatively uniform rubber fingers as illustrated, the brush assembly might consist of a rubber blade and or a row of bristles, attached to the platform. Alternatively, there might exist a combination of a plurality of thin, relatively stiff bristles attached to the bristle platform. Alternatively, one embodiment might comprise a plurality of boars-hair bristles attached to the platform. Alternatively, the type of bristles used in this embodiment could be rearranged by turning the bristles upside down. This alternative embodiment would result in the thinner section of bristles adjacent to the floor and the thicker section of bristles being attached to the bristle head. It is envisioned that the thin section of bristles could provide more flexibility with changes to the floor, thresholds, etc. but the thicker section would allow for pushing strength when thicker, heavier cords are encountered by the device. U.S. application Ser. No. 15/915,277 (filed Mar. 8, 2018) discusses various bristle attachments that might apply.

The present invention is described above in terms of preferred illustrative embodiments. Those skilled in the art will recognize that alternative constructions of such an apparatus, system, and method can be used in carrying out the present invention. Other aspects, features, and advantages of the present invention may be obtained from a study of this disclosure and the drawings, along with the appended claims.

As discussed above, the rubber fingers (i.e., bristles) described herein are illustrative and not intended to be limiting. For instance, an alternative embodiment of the present invention may include bristles in a variety and combination of quantities, characteristic shapes, dimensions, stiffness, arrangements, sizes, bristle types, etc. The different objects described herein as bristles may be characterized as bristle objects (e.g., rubber blade, rubber bristles, thin stiff bristles, boars hair bristles).

Similarly, the bridges or brush assemblies element may be configured in a variety of physical dimensions; materials, movement with respect to the plates (e.g., rectilinear).

Similarly, the brushing implements may be configured in a variety of physical dimensions, materials, securement with respect to sweep (e.g., attachment screws, snapping mechanism, friction). Alternatively, the brushing implements might be connected to different sides/faces of the platform.

Similarly, the plates and extenders may be configured in a variety of physical dimensions, shape, closed, open, movement; locking mechanism (e.g., thumbscrew); hardware.

Other elements may be arranged or designed differently, such as the various standoffs, hardware (e.g., washers) or might not be included at all. These elements should be considered illustrative rather than limiting.

The embodiment shown here illustrates extenders having a generally cross or t-shape. This shape provides a benefit to this embodiment in that the relatively wide nature of the extender allows more lateral movement of the plates toward or away from each other. A longer extender—along with longer extender orifices—could be used to allow for a greater range of movement. And a shorter extender—with shorter orifices—could be used for a more compact device. Further in the alternative, a shorter extender with relatively wider extender orifices could permit more movement in a compact space.

The cross shape of the extender allows for the lateral movement of the plates, and the vertical segment in the center of the extender adds stability between the plates and for the device. In alternative embodiments, a taller vertical segment could be used for even greater stability. In further alternative embodiments, a different shape could be used for different stability considerations. And further in the alternative, the shape of the of the extender could be closer to a rectangle and/or the extender might not be thick in the vertical segment. Rather, the extender would be a thin piece of metal (or other material) that rests entirely on the exterior surface of two plates. In such an embodiment, the extender would not have a portion that rests between the plates. This alternative embodiment might reduce stability, but benefit from lighter materials.

In certain alternative embodiments, the shape of the plates might not resemble a bow tie. Instead, other shapes might be implemented, such as a rectangle, square, triangle, etc. The shape of the embodiment described herein is beneficial in that the shape provides a profile that is more consistent with the shape and profile of a caster wheel. And the approximately parabolic curves provide an angled space for the upper roller orifices to position. Having two or more upper roller orifices arranged at such an angle allows the user to adjust the axles (and wheels) to accommodate different sized wheels. While alternative embodiments could implement two or more lower roller orifices, it is not contemplated as necessary for the size of caster wheels contemplated to be used with this device. The extenders and adjustability of the plates relative to one another allows the device to work with different size wheels. In alternative embodiments, additional lower roller orifices could be implemented.

In alternative embodiments, the device might not include extenders, and instead the device would consist of spacers—interchangeable of different sizes, or of varying length—to separate and adjust the plates.

In alternative embodiments, the device might not have two plates on each side of the caster wheel (for a total of four plates) but instead have a total of two fixed panels. The fixed panels would be separated by axels and wheels. Such fixed panels could be designed for a specific caster wheel in mind. Alternatively, fixed panels could be designed with move roller orifices to accommodate a greater variety of caster wheel sizes.

As used in this application, the term obround refers to a geometric shape consisting of two semicircles connected by parallel lines tangent to their endpoints. The shape is not limited by the angle of the arc or the relative dimensions of the width and height. It is contemplated that several embodiments will incorporate obround orifices on the extenders or the brush assembly adaptor. The obround orifices are beneficial because they are rounded on two ends but include parallel straight edges for the other sides. When adjusting a piece of hardware such as a thumbscrew, a screw, a bolt, etc. the parallel edges provide for linear movement of the hardware, and the rounded edges are well suited for typically cylindrical shafts as components of the hardware when placing the hardware at the edge of the orifice.

Other embodiments might not feature obround orifices. Instead, the orifices might be rectangular (including a traditional polygonal rectangle, as well as a rectangle with four rounded corners, which connect the parallel straight edges having a height and a width). Other rectilinear shapes are well suited for the orifices—for similar reasons to those stated with the obround shape. And in further alternative embodiments, other shapes may be used.

Unless otherwise indicated, all numbers expressing quantities of ingredients, properties such as molecular weight, reaction conditions, and so forth used in the present specification and associated claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques.

Finally, all articles, books, information, journals, magazines, materials, newsletters, newspapers, online materials, patent applications, patent publications, periodicals, publications, texts, and treatises, and/or any other type of publication, cited in this application are herein incorporated by reference in their entirety as if each individual reference was specifically and individually set forth herein. It should be understood that incorporated information is as much a part of the application as filed as if the information was repeated in the application, and should be treated as part of the text of the application as filed.

I claim:

1. A caster wheel protection system comprising:
   a first panel;
   a second panel connected to said first panel by four axles, each axle rotatably connected to said first panel and said second panel;
   a first bridge connected to a proximal end of said first panel, said first bridge connected to a proximal end of said second panel;
   a second bridge connected to a distal end of said first panel, said second bridge connected to a distal end of said second panel;
   a first brush assembly connected to said first bridge, said first brush assembly having a first brush platform and a first plurality of brushing implements, said first plurality of brushing implements arranged non-linearly on said first brush platform; and
   a second brush assembly connected to said second bridge, said second brush assembly having a second brush platform and a second plurality of brushing implements.

2. The caster wheel protection system of claim 1 further comprising a first pair of wheels positioned along a first of said at least four axles, a second pair of wheels positioned along a second of said at least four axles, a third pair of wheels positioned along a third of said at least four axles, a fourth pair of wheels positioned along a fourth of said at least four axles.

3. The caster wheel protection system of claim 2 wherein said first pair of wheels is adjustable along said first of said at least four axles.

4. The caster wheel protection system of claim 1 wherein:
   said first panel comprises a first plurality of first plate upper roller orifices, a second plurality of first plate upper roller orifices, two first plate lower roller orifices;
   said second panel comprises a third plurality of second plate upper roller orifices, a fourth plurality of second plate upper roller orifices, two second plate lower roller orifices;
   said first axle connected to said first plate at said first plurality of first plate upper roller orifices, said first axle connected to said second plate at said third plurality of second plate upper roller orifices;
   said second axle connected to said first plate at said second plurality of first plate upper roller orifices, said second axle connected to said second plate at said fourth plurality of second plate upper roller orifices; and
   said third axle and said fourth axle each connected to said first plate at one of said first plate lower roller orifices, said third axle and said fourth axle connected to said second plate at one of said second plate lower roller orifices.

5. The caster wheel protection system of claim 1 wherein said first plurality of brushing implements oriented in at least two angles relative said first brush platform.

6. The caster wheel protection system of claim 1 wherein:
   said first brush assembly further comprises a first brush adapter, said first brush adapter connected to said first brush platform and slidably connected along said first bridge; and
   said second brush assembly further comprises a second brush adapter, said second brush adapter connected to said second brush platform and slidably connected along said second bridge.

7. The caster wheel protection system of claim 1 wherein: said first brush platform is perpendicular to said first bridge; and said second brush platform is perpendicular to said second bridge.

8. The caster wheel protection system of claim 1 wherein: said first brush platform is arc shaped; said first plurality of brushing implements is arranged along at least part of the perimeter of said first brush platform; said second brush platform is arc shaped; and said second plurality of brushing implements is arranged along at least part of the perimeter of said second brush platform.

9. The caster wheel protection system of claim 1 wherein:
said first panel comprises at least a first plate and a second plate; and
said second panel comprises at least a third plate and a fourth plate,
a first extender slidably connected to said first plate and connected to said second plate; and
a second extender slidably connected to said third plate and connected to said fourth plate.

10. The caster wheel protection system of claim 9 further comprising a first locking mechanism slidably connecting said first extender to said first plate; and a second locking mechanism slidably connecting said second extender to said third plate.

11. A caster wheel protection system comprising:
a first plate having at least one first plate upper roller orifice, at least one first plate lower roller orifice, a first plate thumbscrew orifice;
a second plate having at least one second plate upper roller orifice, at least one second plate lower roller orifice, a second plate thumbscrew orifice;
a third plate having at least one third plate upper roller orifice, at least one third plate lower roller orifice, a third plate thumbscrew orifice;
a fourth plate having at least one fourth plate upper roller orifice, at least one fourth plate lower roller orifice, a fourth plate thumbscrew orifice;
a first roller assembly having an axle, two wheels positioned along an axle, a first end of the axle extending through one of the wheels and a second end of the axle extending through the other wheel, said first end of the axle rotatably positioned within said at least one first plate upper roller orifice, said second end of the axle rotatably positioned within said at least one second plate upper roller orifice;
a second roller assembly having an axle, two wheels positioned along an axle, a first end of the axle extending through one of the wheels and a second end of the axle extending through the other wheel, said first end of the axle rotatably positioned within said at least one third plate upper roller orifice, said second end of the axle rotatably positioned within said at least one fourth plate upper roller orifice;
a third roller assembly having an axle, two wheels positioned along an axle, a first end of the axle extending through one of the wheels and a second end of the axle extending through the other wheel, said first end of the axle rotatably positioned within said at least one first plate lower roller orifice, said second end of the axle rotatably positioned within said at least one second plate lower roller orifice;
a fourth roller assembly having an axle, two wheels positioned along an axle, a first end of the axle extending through one of the wheels and a second end of the axle extending through the other wheel, said first end of the axle rotatably positioned within said at least one third plate lower roller orifice, said second end of the axle rotatably positioned within said at least one fourth plate lower roller orifice;
a first extender having two arms separated by a first extender center segment, each of said two arms having an obround shaped orifice generally parallel to the respective arm;
a second extender having two arms separated by a second extender center segment, each of said two arms having an obround shaped orifice generally parallel to the respective arm;
four thumbscrews, each having a body portion and a threaded arm, each body portion having a diameter larger than the height of at least one of the obround shaped orifices, each threaded arm smaller in diameter than at least half the width of the obround shaped orifices, each threaded arm extending through one of the obround shaped orifices and threadedly connected to one of the plate thumbscrew orifices;
a first bridge having a first end and a second end, at least one first bridge track, said first end of the first bridge connected to the first plate, said second end of the first bridge connected to the second plate;
a second bridge having a first end and a second end, at least one second bridge track, said first end of the second bridge connected to the third plate, said second end of the second bridge connected to the fourth plate;
a first brush assembly having a first brush adapter and a first plurality of rubber fingers separated by a first brush assembly platform, said first brush adapter having at least one track slidably connected to said at least one first bridge track, said first brush assembly platform having an arc shape; said first plurality of rubber fingers arranged at least partially along the perimeter of said first brush assembly platform, said first plurality of rubber fingers oriented in at least two angles relative said first brush assembly platform; and
a second brush assembly having a second brush adapter and a second plurality of rubber fingers separated by a second brush assembly platform, said second brush adapter having at least one track slidably connected to said at least one second bridge track, said second brush assembly platform having an arc shape; said second plurality of rubber fingers arranged at least partially along the perimeter of said second brush assembly platform, said second plurality of rubber fingers oriented in at least two angles relative said second brush assembly platform.

* * * * *